May 26, 1970     R. K. TARBOX     3,513,876
VALVE MANIFOLD MODULE AND SYSTEM

Filed April 9, 1968     19 Sheets-Sheet 1

INVENTOR.
ROBERT K. TARBOX
BY Hamilton, Cook,
Renner & Kenner
ATTORNEYS

May 26, 1970        R. K. TARBOX        3,513,876

VALVE MANIFOLD MODULE AND SYSTEM

Filed April 9, 1968        19 Sheets-Sheet 2

INVENTOR.
ROBERT K. TARBOX
BY Hamilton, Cook,
Renner & Kenner
ATTORNEYS

INVENTOR.
ROBERT K. TARBOX
BY Hamilton, Cook,
Renner + Renner
ATTORNEYS

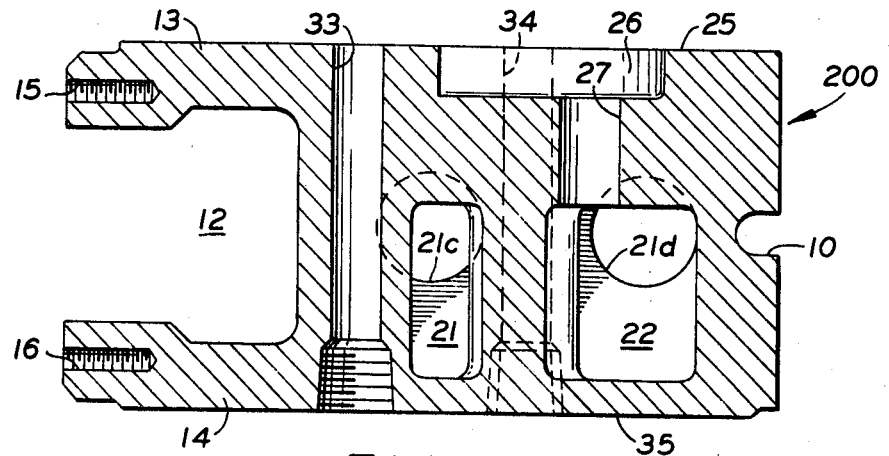
FIG. 13
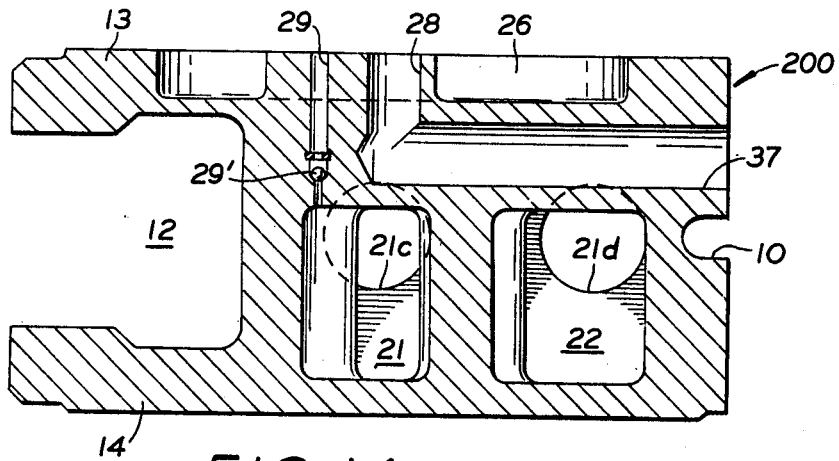
FIG. 14
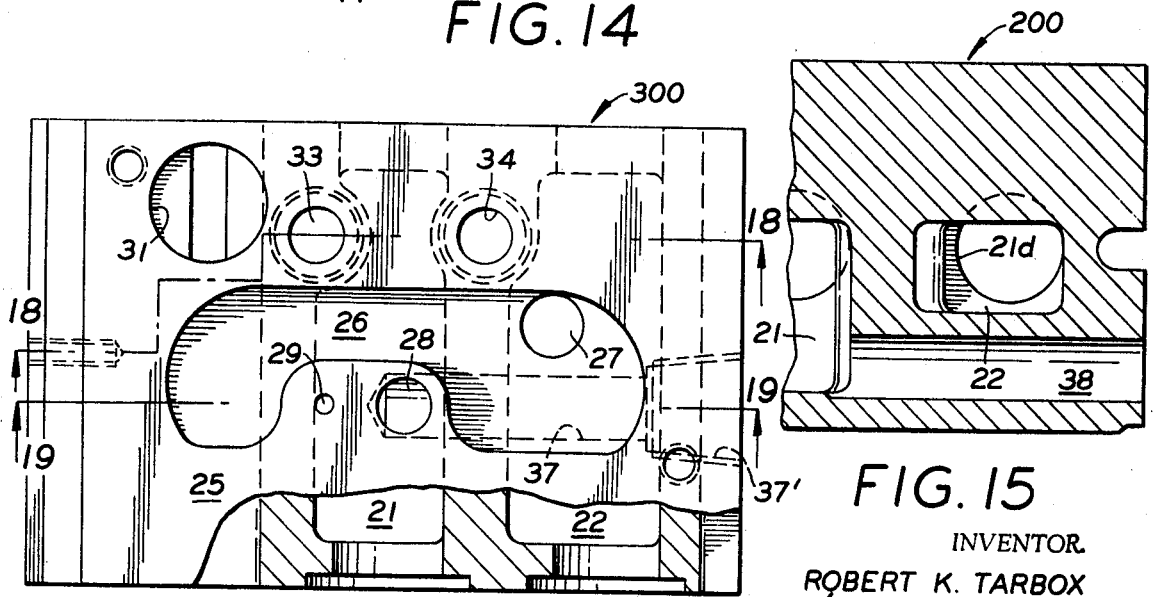
FIG. 16
FIG. 15
INVENTOR.
ROBERT K. TARBOX
BY Hamilton, Cook,
Renner & Kenner
ATTORNEYS May 26, 1970 R. K. TARBOX 3,513,876
VALVE MANIFOLD MODULE AND SYSTEM
Filed April 9, 1968 19 Sheets-Sheet 8

INVENTOR.
ROBERT K. TARBOX
BY Hamilton, Cook,
Renner & Kenner
ATTORNEYS

INVENTOR.
ROBERT K. TARBOX
BY *Hamilton, Cook,*
*Renner & Kenner*
ATTORNEYS

INVENTOR.
ROBERT K. TARBOX
BY Hamilton, Cook,
Renner & Kenner
ATTORNEYS

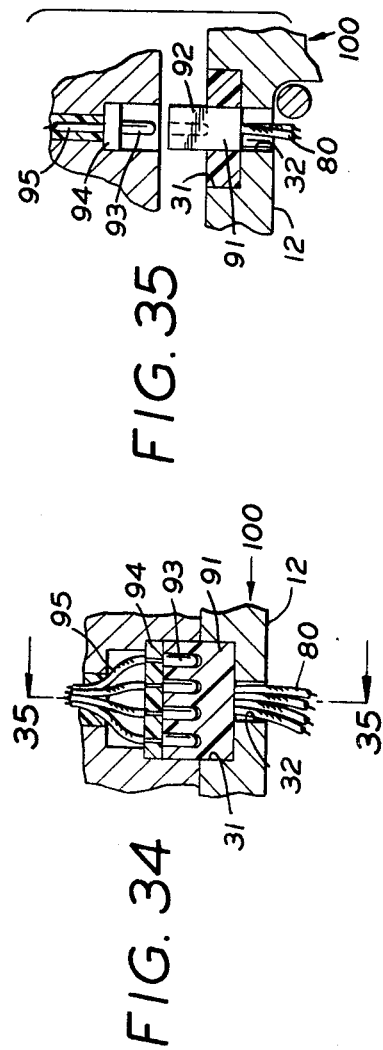
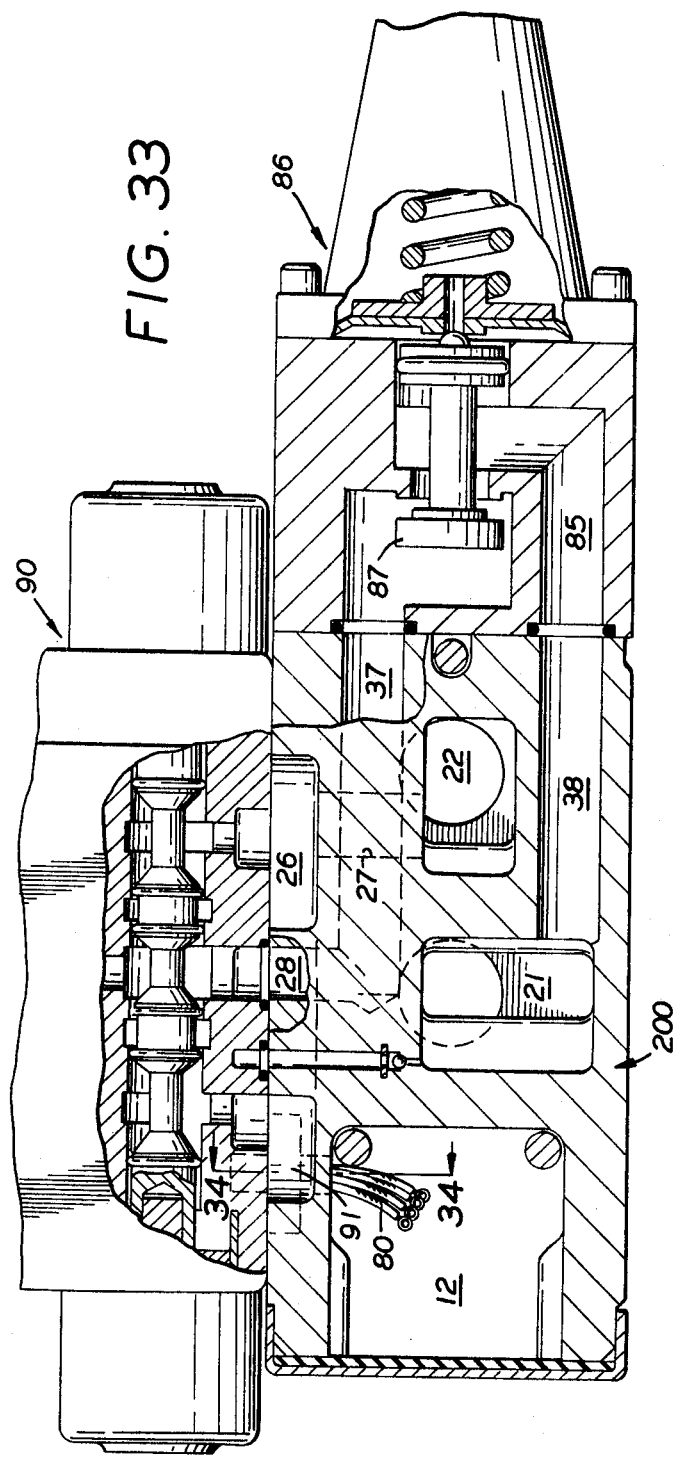

May 26, 1970 R. K. TARBOX 3,513,876
VALVE MANIFOLD MODULE AND SYSTEM
Filed April 9, 1968 19 Sheets-Sheet 15
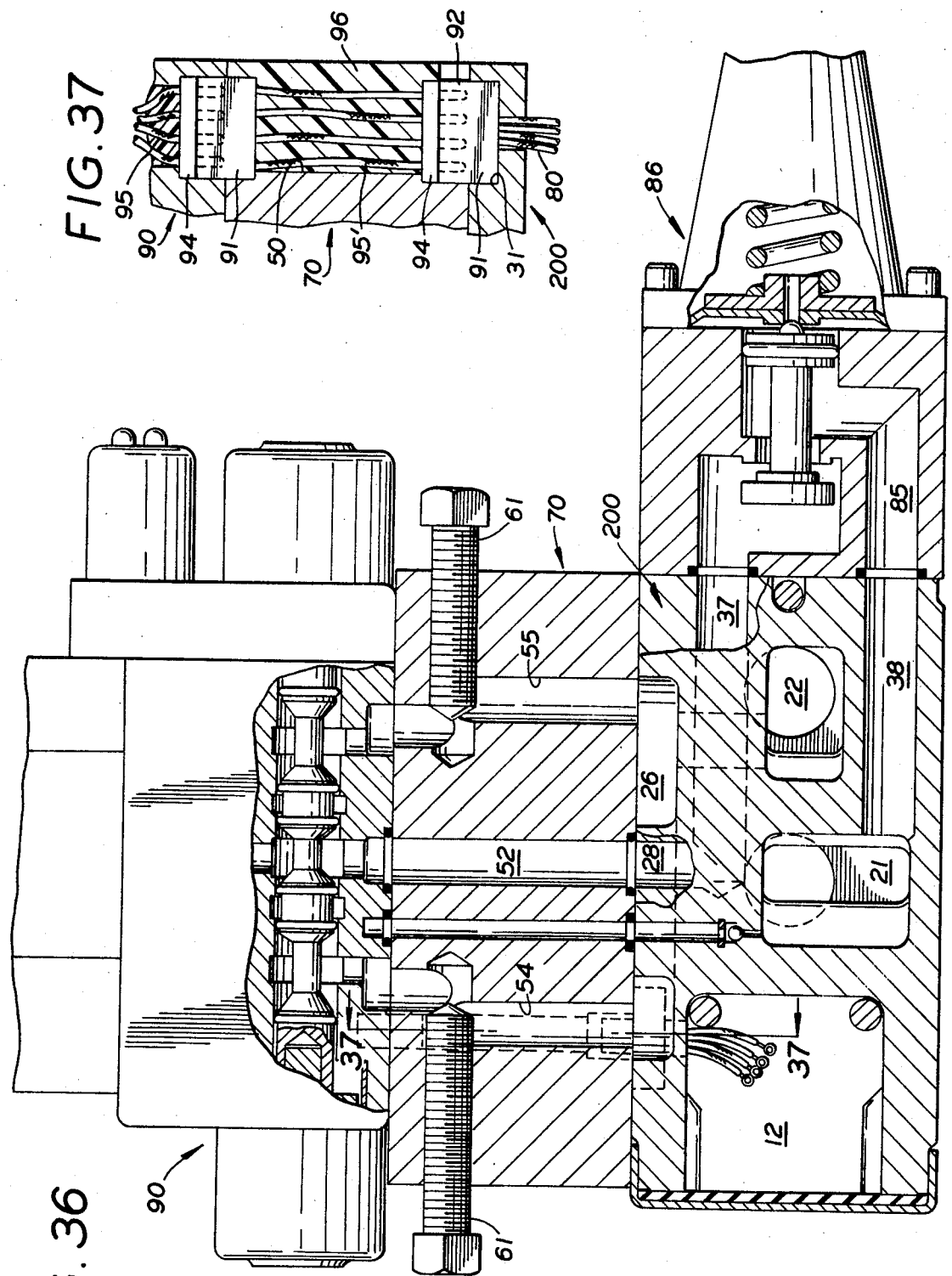
INVENTOR.
ROBERT K. TARBOX
BY Hamilton, Cook,
Renner & Renner
ATTORNEYS

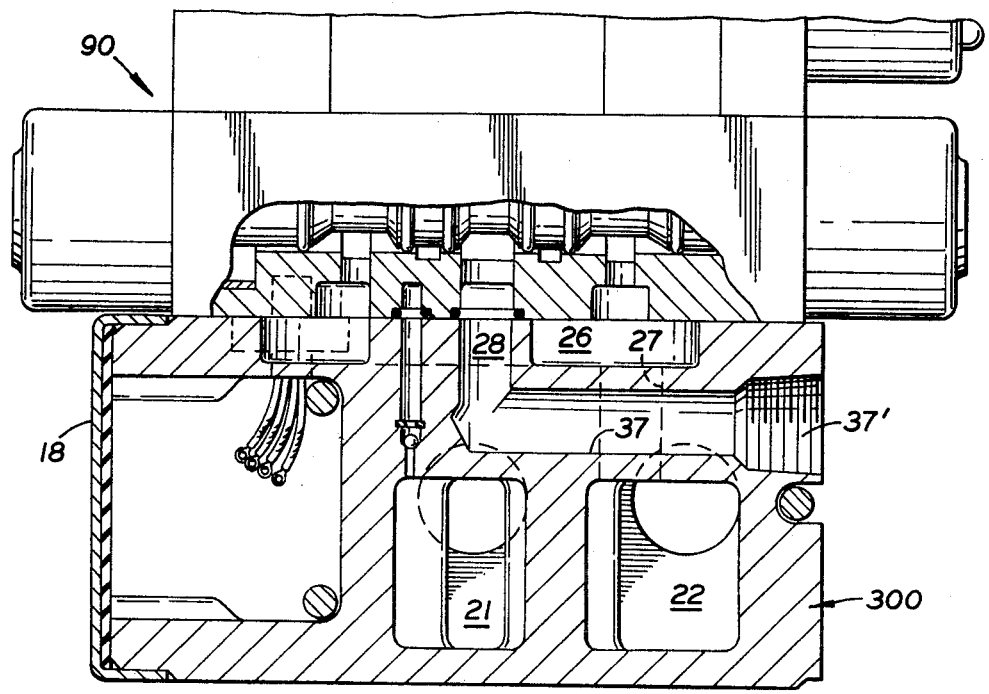
FIG. 38
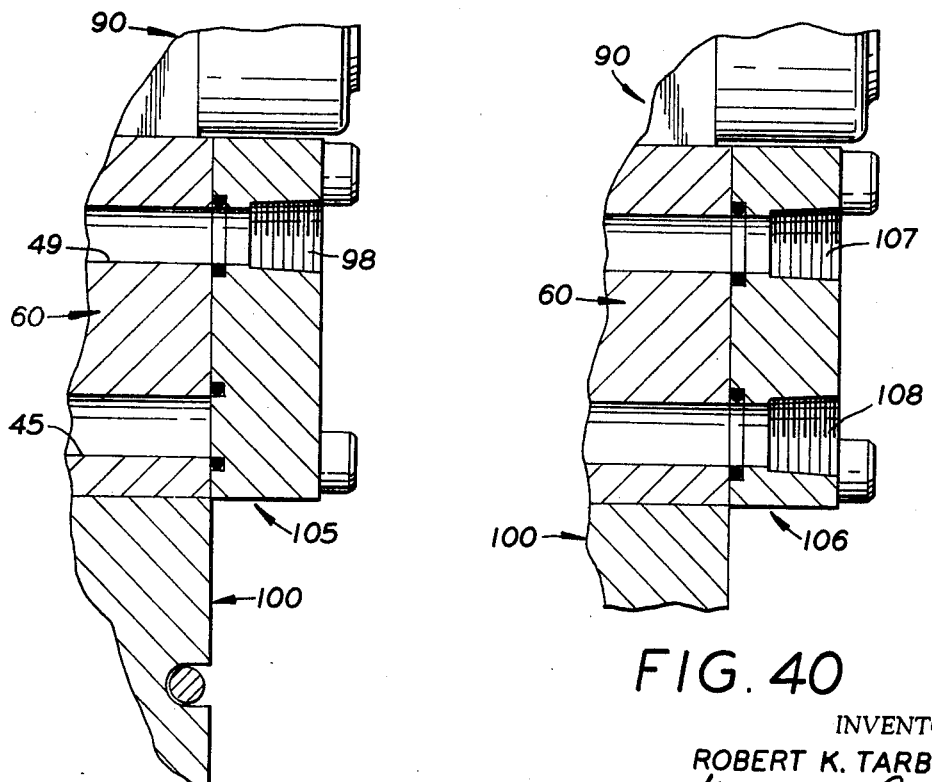
FIG. 39
FIG. 40
INVENTOR.
ROBERT K. TARBOX
BY Hamilton, Cook,
Renner & Kenner
ATTORNEYS May 26, 1970  R. K. TARBOX  3,513,876
VALVE MANIFOLD MODULE AND SYSTEM
Filed April 9, 1968  19 Sheets-Sheet 17

INVENTOR.
ROBERT K. TARBOX
BY Hamilton, Cook,
Renner & Kenner
ATTORNEYS

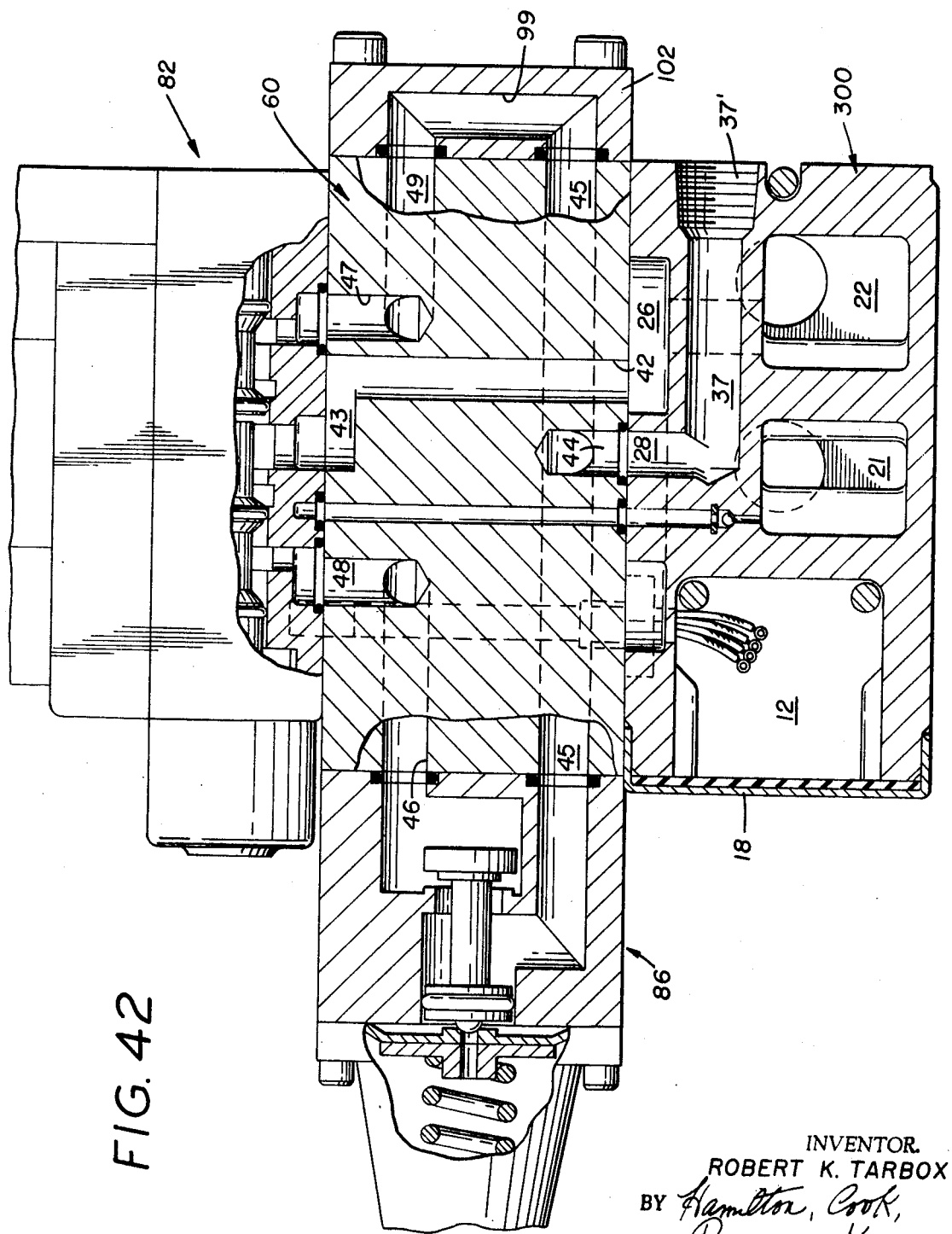

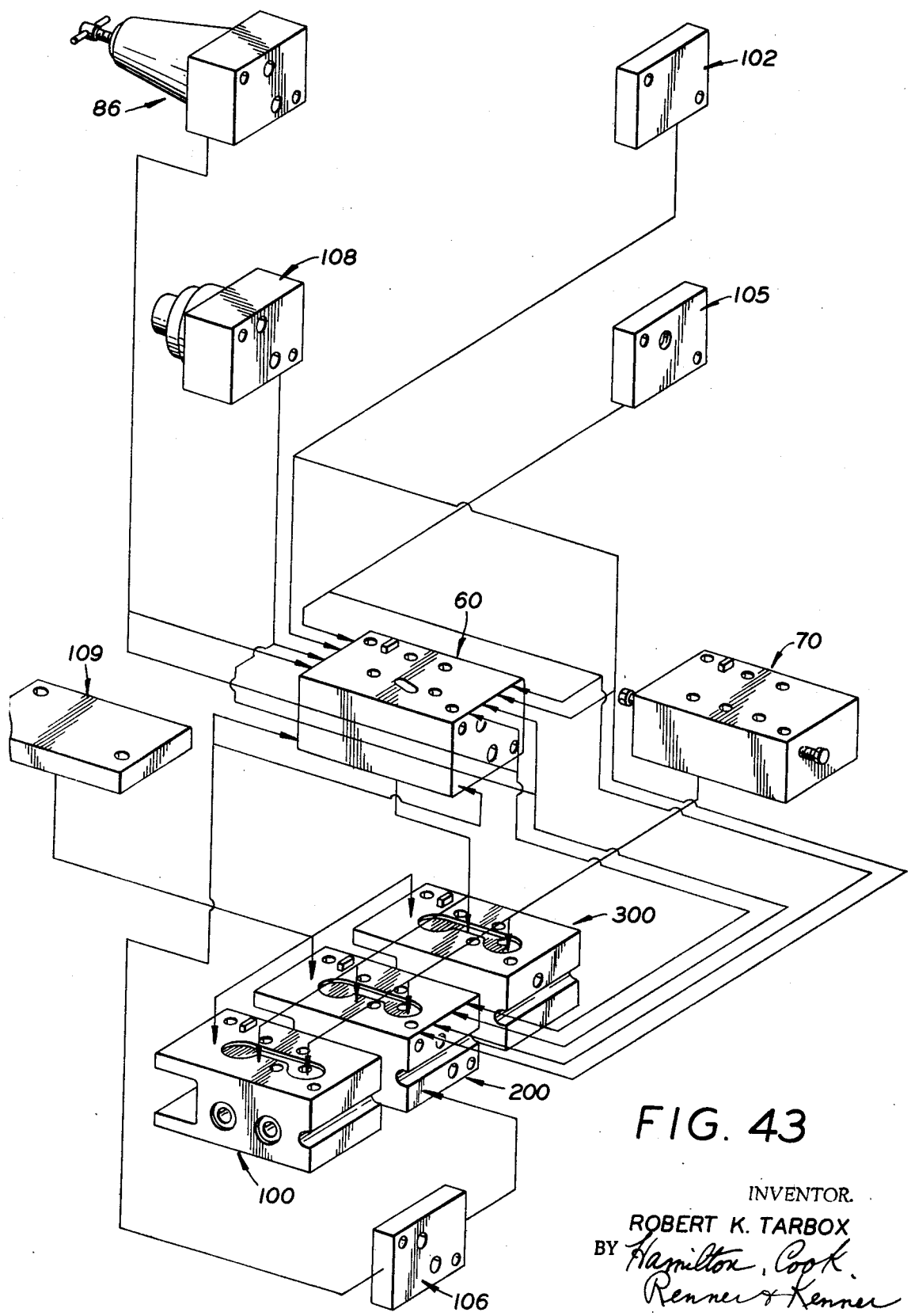

United States Patent Office

3,513,876
Patented May 26, 1970

---

3,513,876
VALVE MANIFOLD MODULE AND SYSTEM
Robert K. Tarbox, Akron, Ohio, assignor to Akro-Tec Incorporated, Akron, Ohio, a corporation of Ohio
Filed Apr. 9, 1968, Ser. No. 719,964
Int. Cl. F16k *11/20, 11/24*
U.S. Cl. 137—596
16 Claims

ABSTRACT OF THE DISCLOSURE

A fluid valve manifold system consisting of modular block components connectable in abutting relation in selective interchangeable combinations and arrangements, certain faces of said blocks being selectively connectable to various valve and accessory components to suit various pressure and control requirements, said modular blocks being modifications of one basic module and adapted for conducting pressure fluid and electrical conductors throughout the system, whereby a multiplicity of component arrangements may be accomplished without changing the component construction and without external piping or wiring.

Background of the invention

Modern industrial plants require a large number and variety of machines, devices and controls which are operated by air or hydraulic pressure, and requirements for the fluid pressure operating and control systems involved become very complex and expensive. Not only does the initial installation of any particular system require a great amount of expensive custom piping and wiring to make the system operative, but also each time the system is added to or modified, a corresponding amount of changing or adding to the piping and wiring connections is needed. In these days of excessive labor and material costs, the costs of improving or changing an existing fluid system are often substantially prohibitive.

As a consequence, many plants tend to sacrifice time and efficiency by continuing to utilize an obsolete or makeshift operation or control system rather than to change in order to improve their operation as required by new and improved machinery and equipment.

Attempts have been made to provide fluid systems having interchangeable components which require less custom design, construction, and connections, but such attempts of which I am aware have resulted in such a large number of different components as to involve excessively high material costs as well as special skills in installing and assembling the components.

It is a primary object of the present invention to provide a novel valve manifold system composed of a minimum number of interchangeable module blocks selectively abuttingly connectable to each other and to various valves and accessories in a multiplicity of arrangements.

Another object is to provide a novel basic module block construction which is quickly and easily modified to form all of the modules.

A further object is to provide a novel module block construction embodying fluid and electrical conduits adapted to connect with conduits in other abuttingly connected modules and valves and accessories, without requiring special skills.

Summary of the invention

These and other objects are accomplished by providing a basic module block having a predetermined arrangement of ports therein opening from certain abutment faces thereof, and additional module blocks having ports and abutment faces for connecting certain of said ports to form electrical conduits and pressure and exhaust manifolds, other faces of said blocks adapted by abutment to connect other ports with operating or control conduits, and with valves, adaptors and accessories.

Description of the drawings

FIG. 3 is an enlarged top plan view of the three module blocks of FIG. 1 clamped in abutting relation.

FIG. 4 is an end elevation of line 4—4 of FIG. 3.

FIG. 13 is a sectional view on line 13—13 of FIG. 11.

FIG. 14 is a sectional view on line 14—14 of FIG. 11.

FIG. 15 is a partial sectional view on line 15—15 of FIG. 11.

FIG. 16 is a top plan view of the module block at the far end of FIG. 1.

FIG. 33 is a vertical sectional view, partly in elevation, of a single pressure spool valve superposed upon the module block of FIG. 11, with a pressure regulator in abutment with one end of the block.

FIG. 34 is a partial sectional view on line 34—34 of FIG. 33, showing the plug and socket electrical connections between the module block and valve.

FIG. 35 is a similar view at right angles to FIG. 34, showing the plug and socket disconnected.

FIG. 36 is a vertical sectional view, partly in elevation, of the adaptor block of FIG. 26 and a single pressure spool valve superposed upon the module block of FIG. 11, with a pressure regulator in abutment with one end of the block.

FIG. 37 is a partial sectional view on line 37—37 of FIG. 36.

FIG. 38 is a vertical sectional view, partly in elevation, of a single pressure spool valve superposed upon the module block of FIG. 16.

FIG. 39 is a partial vertical sectional view showing an external feed cap abutting one end of the adaptor block of FIG. 23.

FIG. 40 is a similar view showing a cap for remote feed and return abutting one end of the adaptor block of FIG. 23.

FIG. 42 is a vertical sectional view, partly in elevation, of the adaptor block of FIG. 23 and a dual pressure spool valve superposed upon the module block of FIG. 16, with a pressure regulator abutting one end of the adaptor block and a recirculating cap abutting the other end.

FIG. 43 is a schematic isometric view showing different combinations of module blocks, adaptor blocks and accessories.

Description of preferred embodiments

Figure 1:
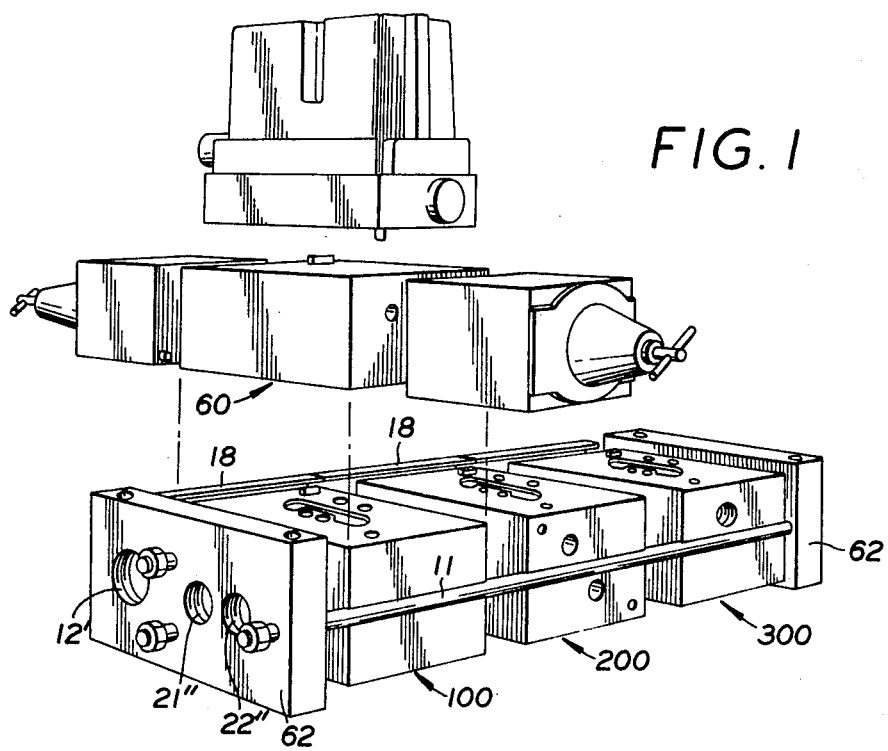
FIG. 1 is an exploded perspective view of a combination of three side-by-side abutting manifold module blocks with end clamping plates, an adaptor block and valve superposed on one of said manifold blocks, and pressure regulators abutting the ends of the adaptor block.
Figure 2:
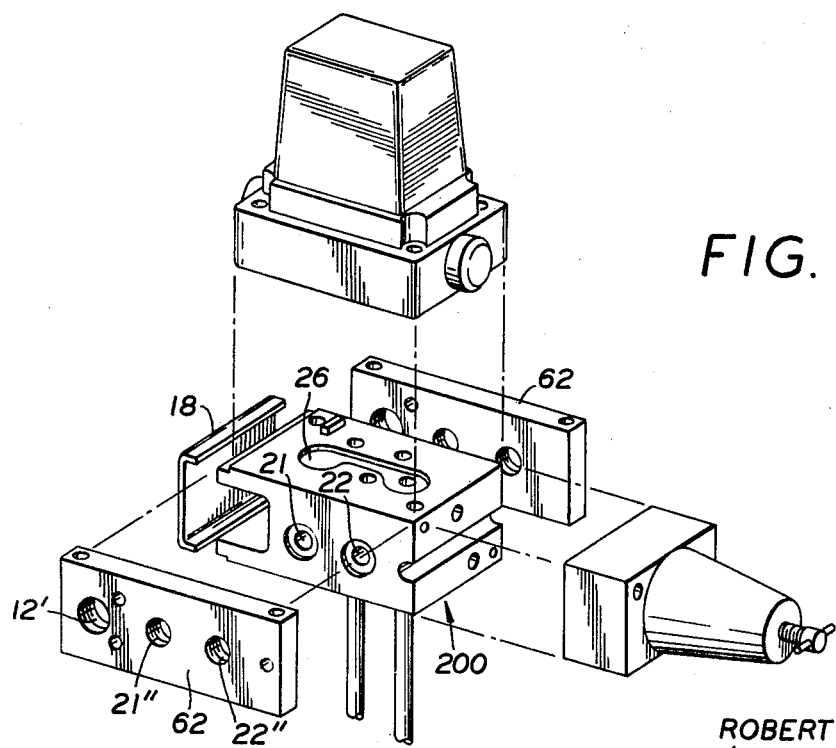
FIG. 2 is an exploded perspective view of a similar combination of the middle module block in FIG. 1 with side clamping plates, a superposed valve, an end abutting regulator and a cap plate closing the electrical conduit recess at the other end.
Figure 5:
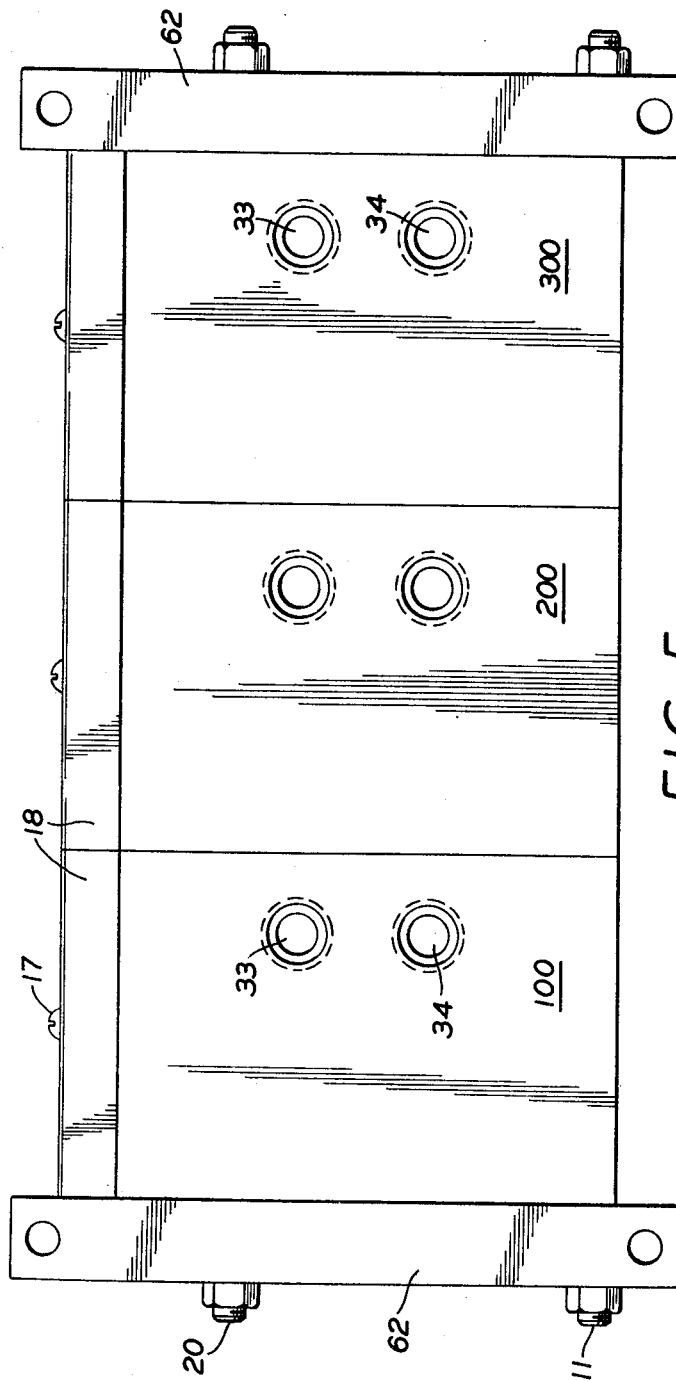
FIG. 5 is a bottom plan view of the assembly of FIG. 3.
Figure 21:
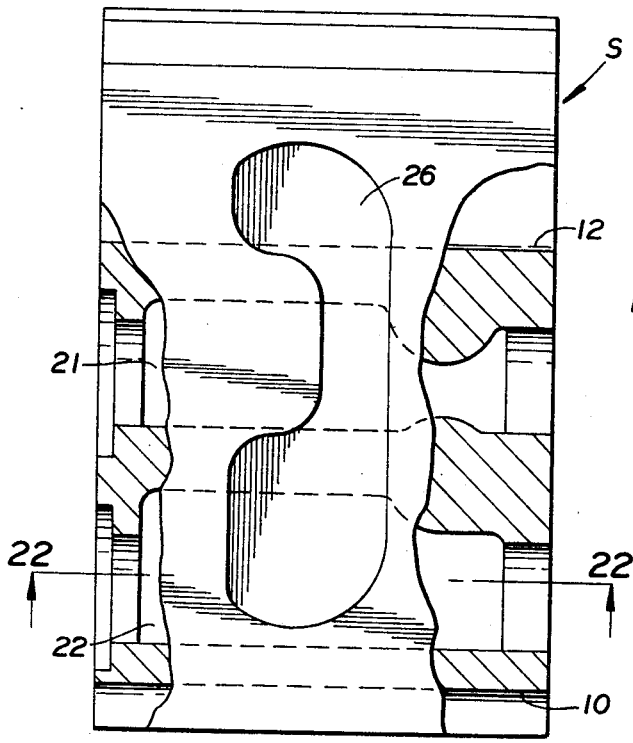
FIG. 21 is an enlarged top plan view of said spacer block.
Figure 22:
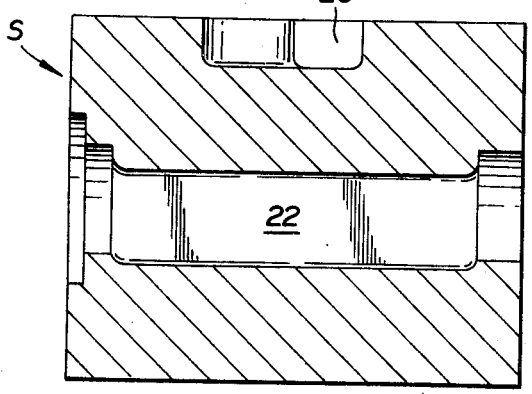
FIG. 22 is a sectional view on line 22—22 of FIG. 21.

The three manifold module blocks shown in FIGS. 1, 3 and 5 are designated 100, 200 and 300, respectively. These three blocks are all made from the same basic block which is preferably a metal casting, as shown in FIGS. 21 and 22, and serving as a spacer block S in the manner indicated in FIG. 20. The 100, 200 and 300 blocks are essentially the same as the basic spacer block with the addition of certain tapped holes as will be described.

Figure 6:
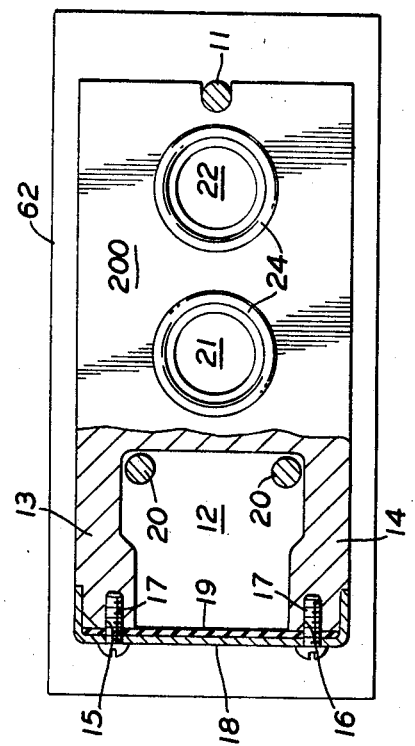
FIG. 6 is a cross-sectional view as on line 6—6 of FIG. 3.

Referring to FIGS. 7–10, showing the details of the 100 block, the front end of block 100 has a horizontal groove 10 formed therein for receiving a clamping bolt 11 which ties several module blocks together in abutting relation as seen in FIG. 1. The rear end of the block has a formed channel recess 12 for housing electrical wires, the top and bottom legs 13 and 14 of the casting which form the recess having tapped holes 15 and 16, respectively, for receiving screws 17 to attach a closure cap 18 over the recess. Identical caps are attached to the blocks 200 and 300, as best shown in FIG. 6. Sealing gaskets 19 may be provided under the caps. Preferably, clamping bolts 20 pass through the inner corners of the channel 12.

Pressure and exhaust manifold passageways, indicated generally at 21 and 22, respectively, extend horizontally through the block 100 from side to side. The passageways have circular portions at their ends with intermediate irregular rectangular portions. On one side 23 the circular portions 21a and 21b are enlarged to form annular recesses 21' and 22' to receive O-ring seals 24 (FIG. 3), while on the other side 24 the end circular portions 21c and 21d extend straight out to the surface.

The top surface 25 of the block has a central substantially kidney-shaped recess 26. As seen in FIGS. 21 and 22, the basic casting S has formed therein the top recess 26, the manifolds 21 and 22, the front bolt groove 10 and the rear recess 12. The larger end of recess 26 is connected by a drilled vertical port 27 to the transverse exhaust passageway 22. A drilled vertical port 28 adjacent the narrow part of top recess 26 connects with the pressure passageway 21 and opens out through the top surface 25. A drilled vertical pilot port 29 adjacent port 28 also connects pressure passageway 21 to the top surface 25, and has a ball check 29' therein. Attaching holes 30 are tapped in the top surface 25 in diagonally opposite corner portions. As viewed in FIG. 7, a circular recess 31 is machined in the top surface adjacent the upper left attaching hole 30, and the recess 21 communicates with the transverse electrical wire recess 12 by means of a milled slot 32.

Figure 7:
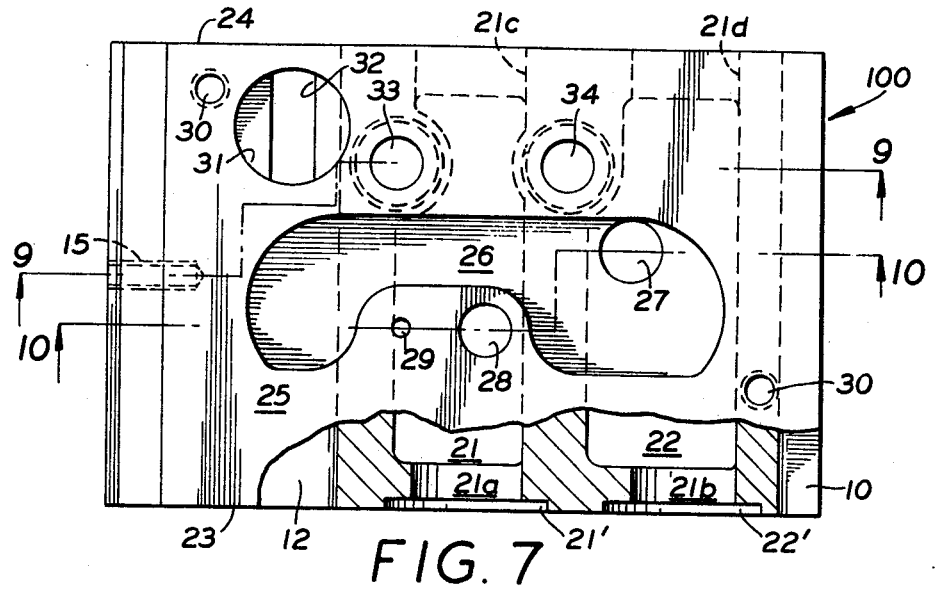
FIG. 7 is an enlarged top plan view of the module block at the near end of FIG. 1, partly broken away and in section.
Figure 8:
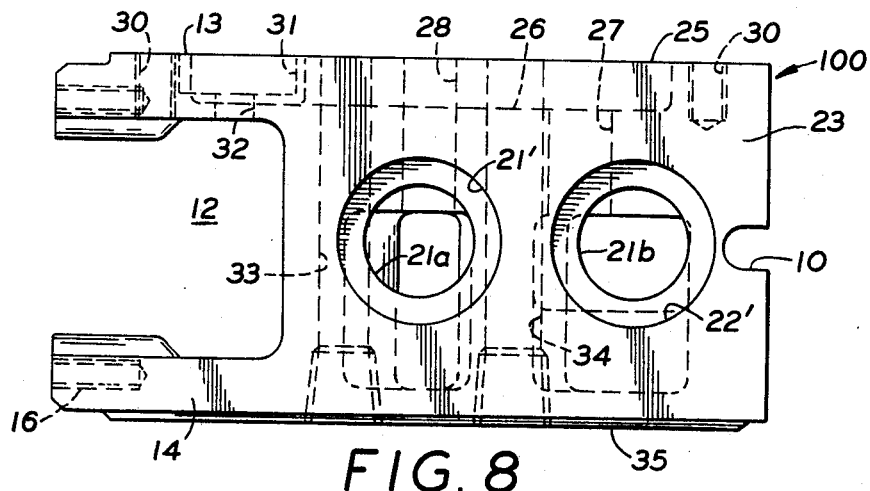
FIG. 8 is a side elevation thereof.
Figure 9:
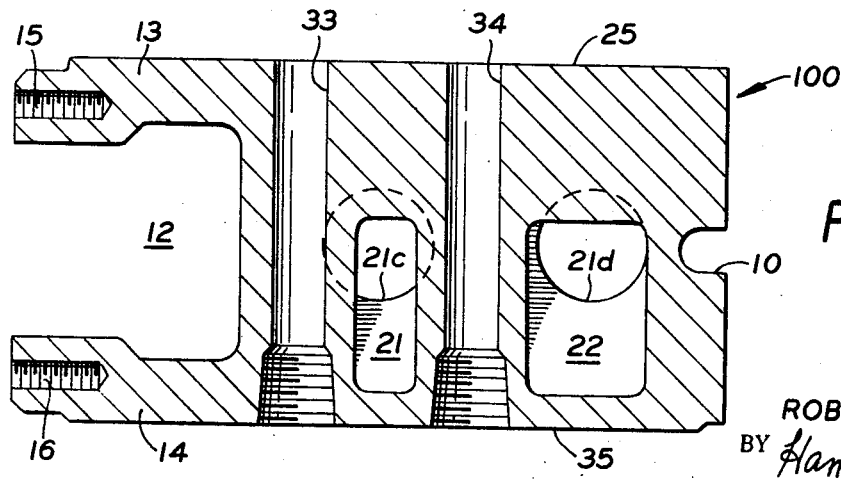
FIG. 9 is a sectional view on line 9—9 of FIG. 7.
Figure 10:
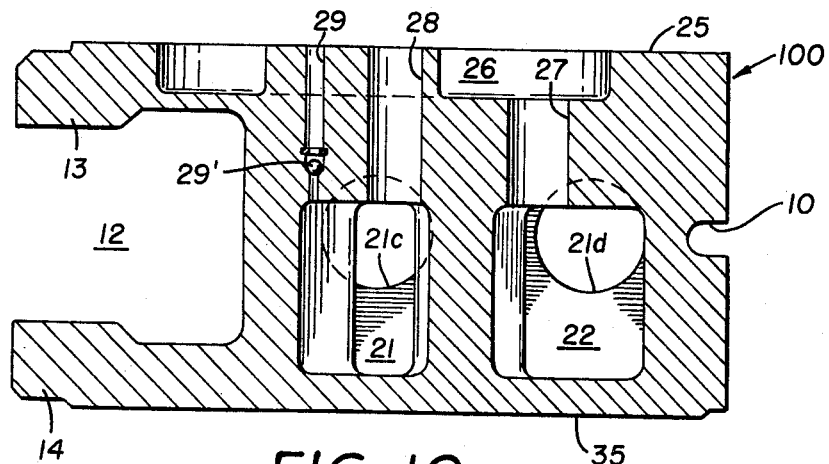
FIG. 10 is a sectional view on line 10—10 of FIG. 7.
Figure 11:
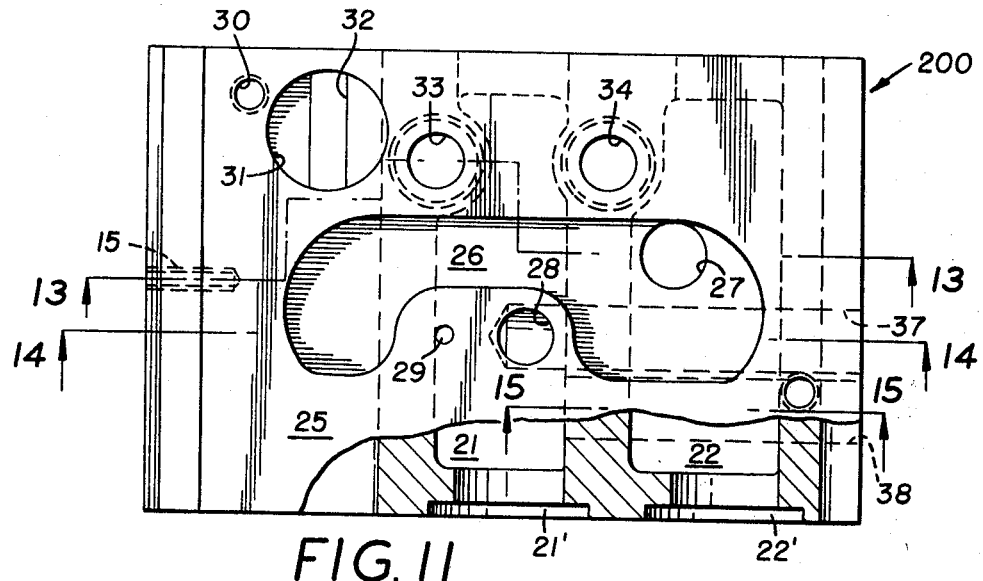
FIG. 11 is an enlarged top plan view of the basic module block shown in FIG. 2.
Figure 12:
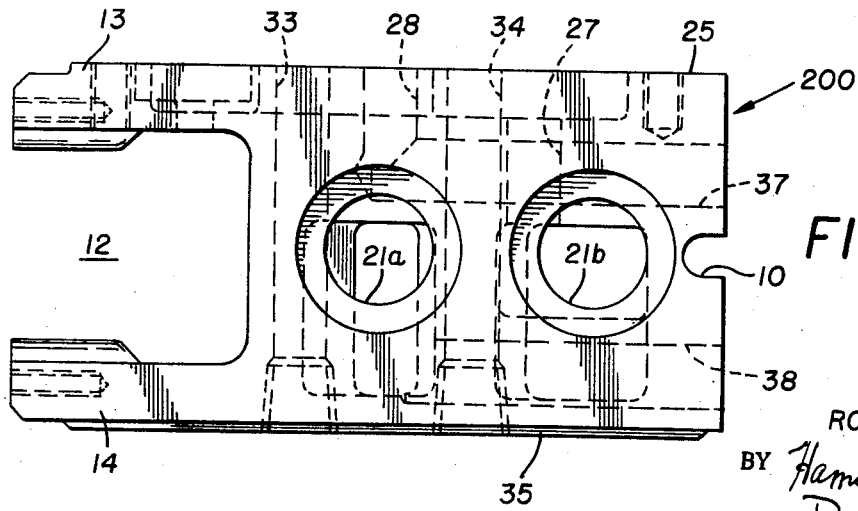
FIG. 12 is a side elevation thereof.
Figure 17:
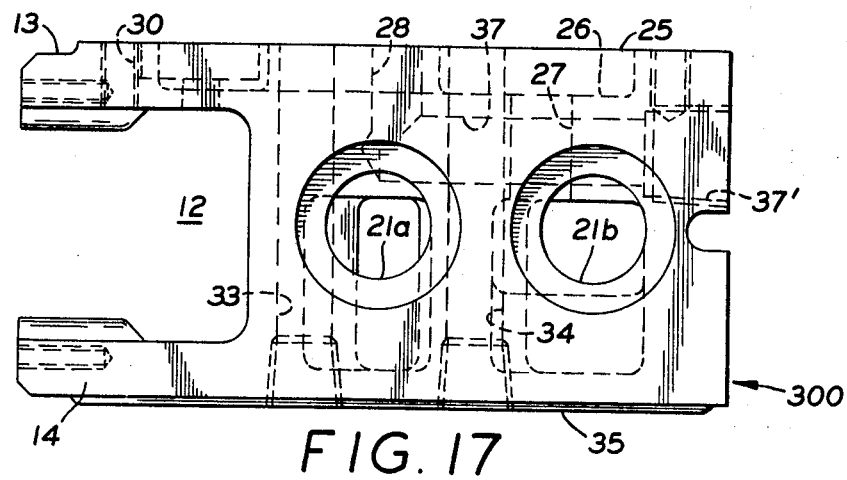
FIG. 17 is a side elevation thereof.
Figure 18:
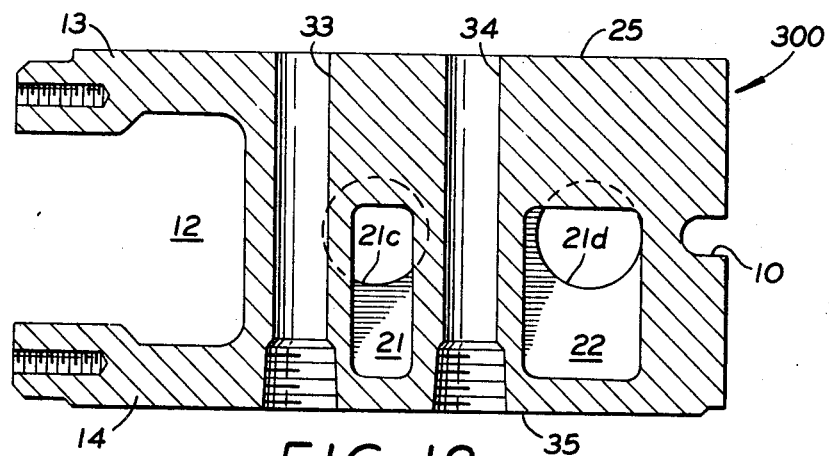
FIG. 18 is a sectional view on line 18—18 of FIG. 16.
Figure 19:
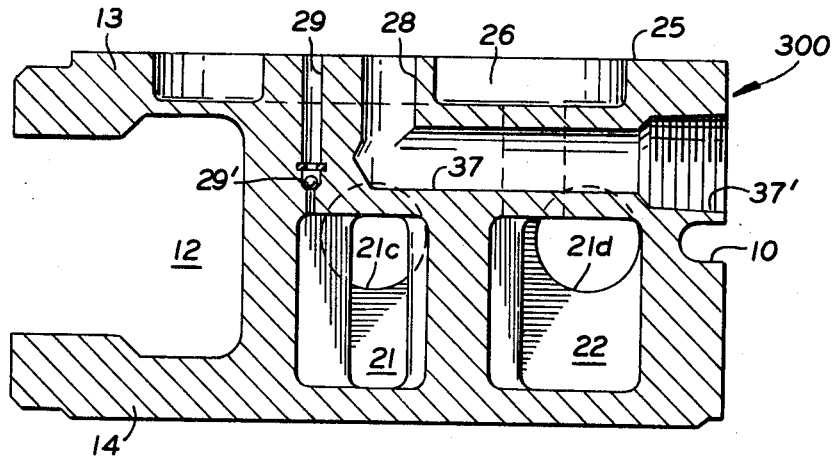
FIG. 19 is a sectional view on line 19—19 of FIG. 16.

Fluid supply and return ports 33 and 34 extend vertically through the block from the top surface 25 to the bottom surface 35. The bottom ends of these ports are tapped for connection lines leading to the fluid devices which are operated or controlled by the improved manifold system of the present invention. As shown in FIG. 7, the ports 33 and 34 are located on opposite sides of a narrow intermediate portion of pressure passageways 21 and emerge at the top surface adjacent the straight side of recess 26.

The 200 block shown in FIGS. 11–15 is identical to the 100 block except that the pressure passageway 21 is not connected to the upper surface of the block by vertical port 28, but instead the port 28 stops short of manifold 21 and a horizontal drilled port 37 connects the lower end of port 28 to the front end surface of the block. Also, as seen in FIG. 15, the pressure passageway 21 is connected to the front surface of the block by a drilled port 38.

The 300 block shown in FIGS. 16–19 is identical to the 200 block except that the front end of horizontal port 37 is tapped at 37' for connection to an auxiliary pressure supply line and there is no connection between the pressure passageway 21 and the front surface of the block. In other words, the port 38 of block 200 is not drilled in block 300.

Figure 20:
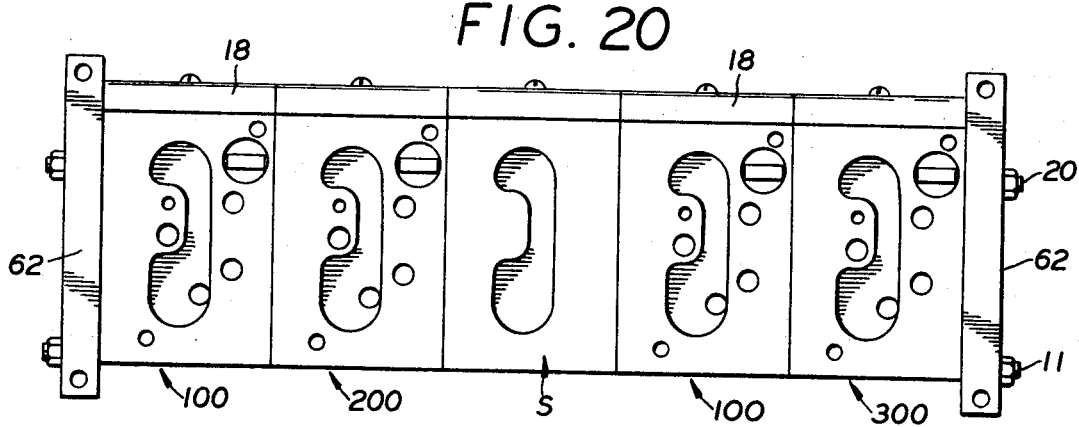
FIG. 20 is a top plan view of an assembly of module blocks including a spacer module block at the center.

A combination of manifold module blocks different from the combination shown in FIG. 1 is shown in FIG. 20, comprising a spacer block S at the center with a 200 block abutting one side and a 100 block abutting the other side. A 100 block abuts the other side of the 200 block and a 300 block abuts the other side of the 100 block. The spacer block provides space above and below for any desired purpose, such as may be needed for positioning equipment, conduits and the like. Obviously, a multiplicity of combinations of the module blocks with any desired number of spacer blocks may be used as desired, as the spacer blocks preserve the continuity of the manifolds, bolt grooves and electrical wire channels extending through all the blocks.

In any case, the module blocks, with or without spacer blocks, are clamped in side-by-side abutting relation by tie bolts 11 and 20, with end plates 62 abutting the end module blocks and having tapped holes 21" and 22" registering with manifolds 21 and 22, and tapped holes 12' registering with the electrical wire channels 12. Thus, piping and electrical conduits can be connected to both ends. As seen in FIG. 3, O-ring seals are provided around the manifolds between the blocks and between the blocks and end plates.

Figure 23:
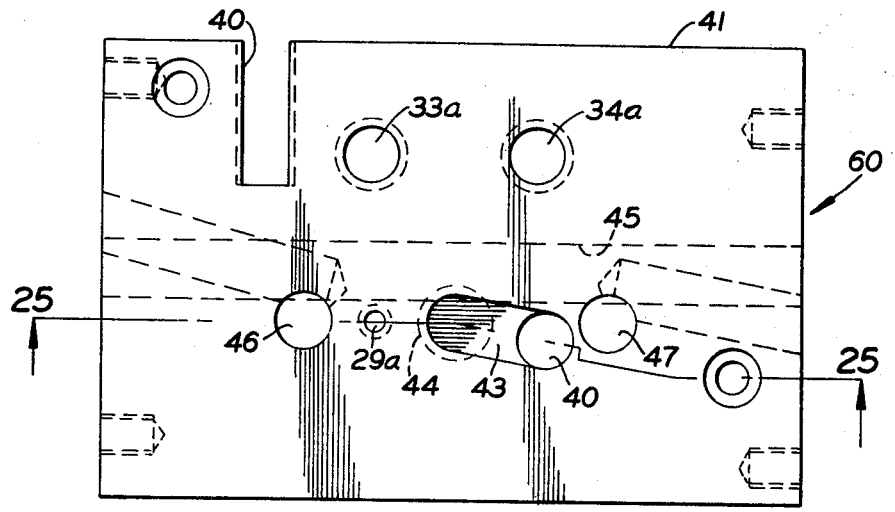
FIG. 23 is a top plan view of an adaptor block to be superposed on any one of the module blocks.
Figure 24:
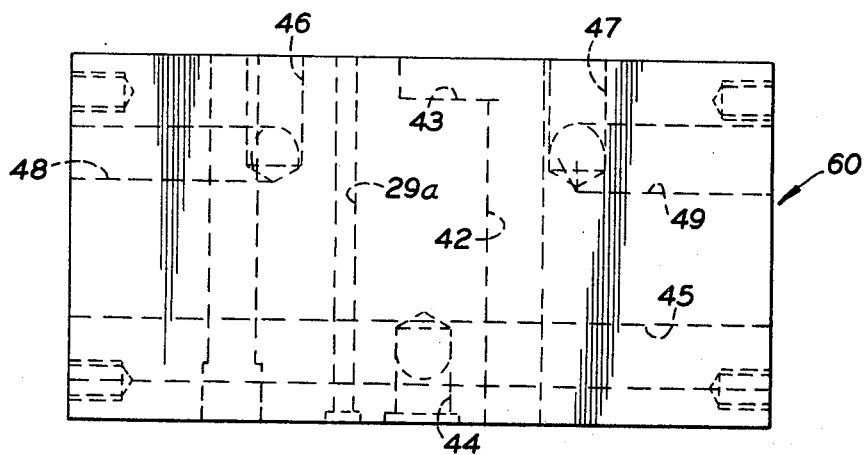
FIG. 24 is a side elevation thereof.
Figure 25:
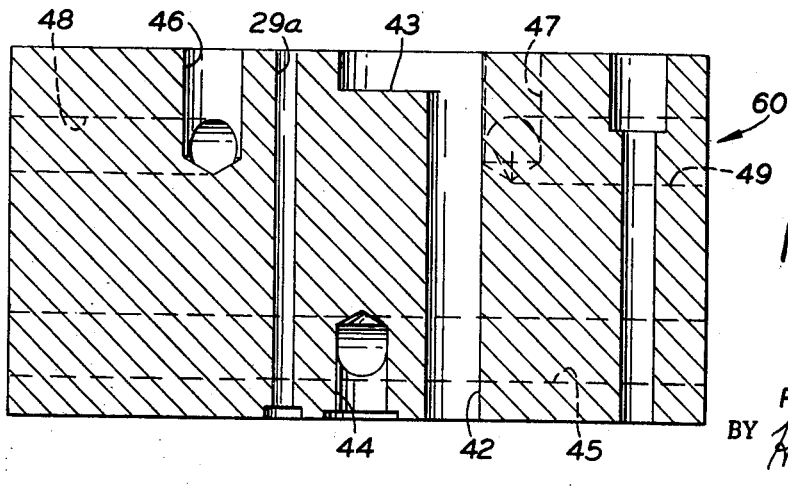
FIG. 25 is a sectional view on line 25—25 of FIG. 23.

The adaptor block or dual pressure block 60 shown in detail in FIGS. 23–25 has the same length and width as the 100, 200 and 300 module blocks, and is adapted to abuttingly fit on top of any of them. The vertical through ports 33a and 34a will register with the supply and return ports 33 and 34 in any of the module blocks, and the vertical notch 40 in the side surface 41 will be aligned with the electrical wire recess 31 in any of the module blocks.

Block 60 has a vertical exhaust port 42 extending from top to bottom and connected to a lateral offset opening 43 in its upper surface, for a purpose to be described. A vertical pilot port 29a parallels port 42. A vertical pressure port 44 extending upward from the bottom surface registers with the vertical pressure port 28 in any of the module blocks, and connects with the side of a horizontal passageway 45 extending longitudinally through the lower portion of the block 60. In the upper portion of the block are two vertical pressure ports 46 and 47 opening through the upper surface and connected at their lower ends with horizontal ports 48 and 49, respectively, which extend to opposite ends of the block.

Figure 26:
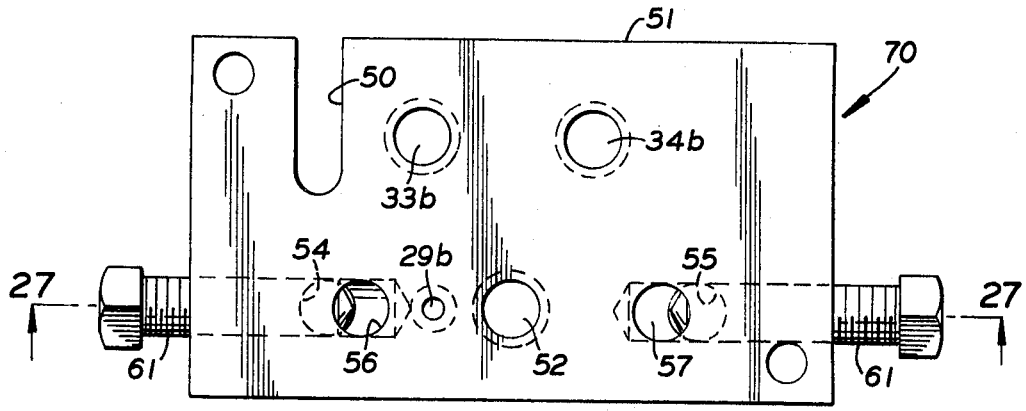
FIG. 26 is a top plan view of another adaptor block to be superposed on any one of the module blocks.
Figure 27:
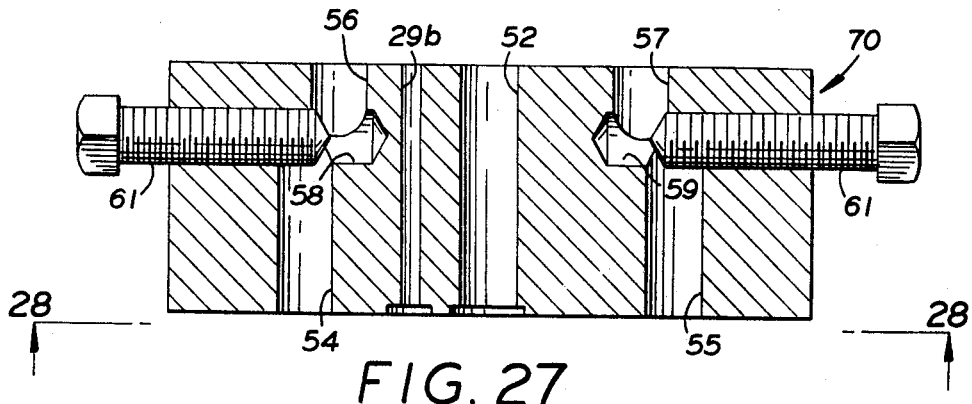
FIG. 27 is a sectional view thereof.
Figure 28:
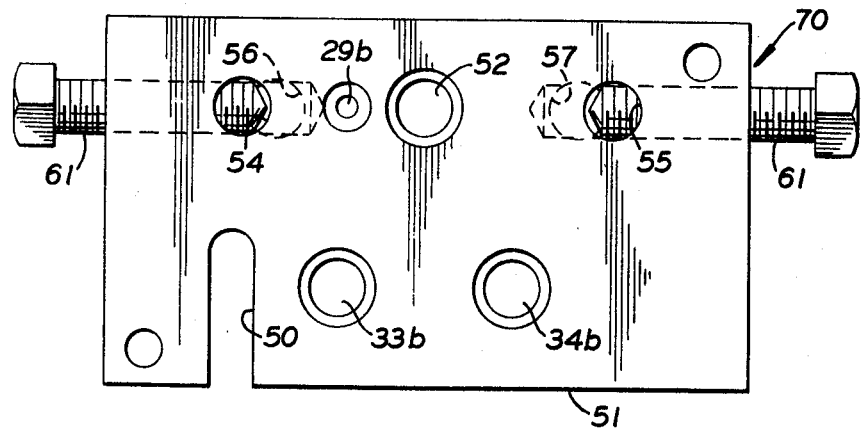
FIG. 28 is a bottom plan view thereof.

The adaptor block or dual exhaust block 70 shown in detail in FIGS. 26–28 has the same length as the 100, 200 and 300 module blocks but is narrower in width, and is also adapted to abuttingly fit on the top of any of them. The vertical through ports 33b and 34b will register with the through ports 33 and 34 in any of the module blocks, and the vertical notch 50 in the side surface 51 will be aligned with the electrical wire recess 31 in any of the module blocks.

Block 70 has a vertical pressure port 52 extending from top to bottom which, when the ports 33b and 34b register with ports 33 and 34, will register with the pressure port 28 in any one of the module blocks. A vertical pilot port 29b parallels port 52. Two exhaust ports 54 and 55 extend upwardly from the bottom surface and are adapted to register with the opposite ends of the exhaust recess 26 in any of the module blocks. Offset exhaust ports 56 and 57 extend downwardly from the upper surface and their bottom ends are connected to the upper ends of ports 54 and 55, respectively, by horizontal holes 58 and 59, respectively, extending to the opposite end surfaces of the block. Metering screws 61 are screwed into the holes 58 and 59 to control the exhaust passing from ports 56 and 57 to ports 54 and 55.

Figure 29:
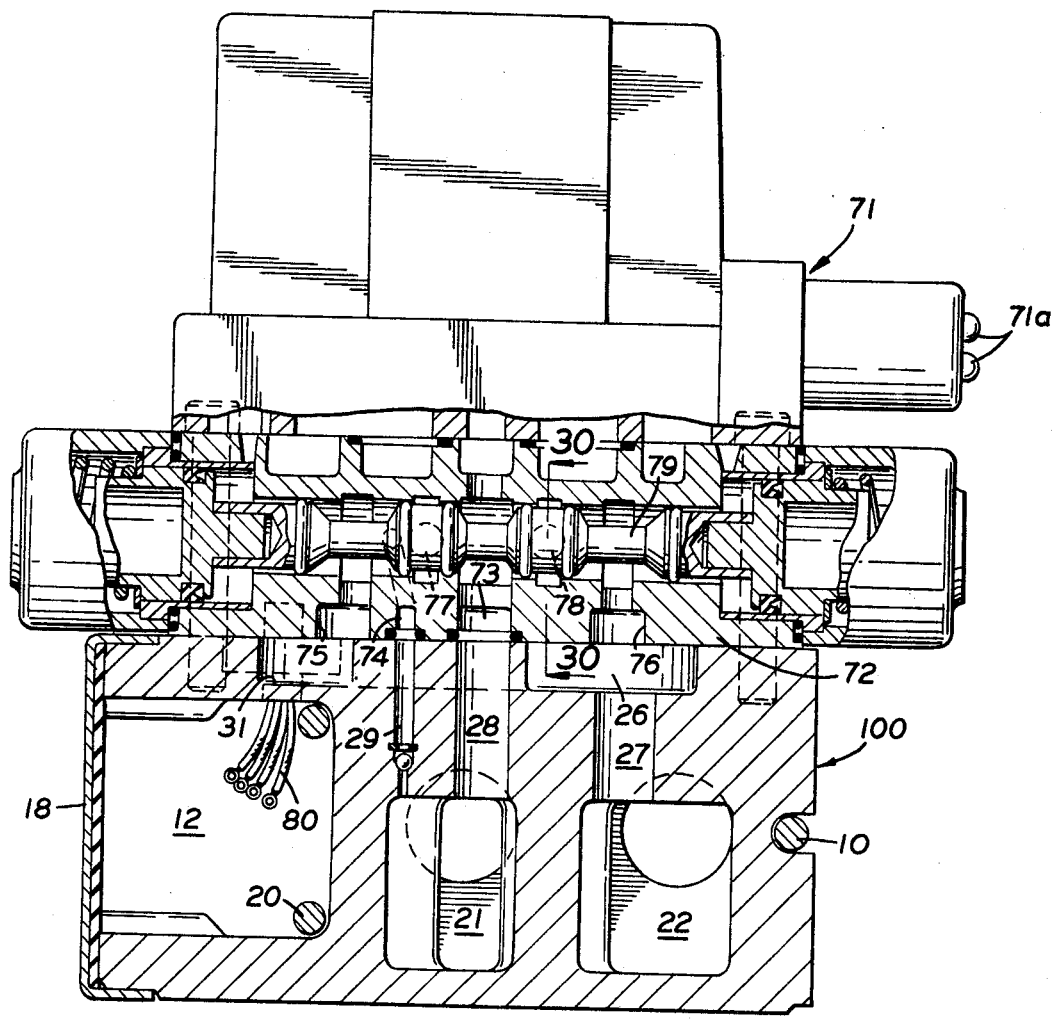
FIG. 29 is a vertical sectional view, partly in elevation, showing a single pressure spool valve superposed upon the valve module of FIG. 7.
Figure 30:
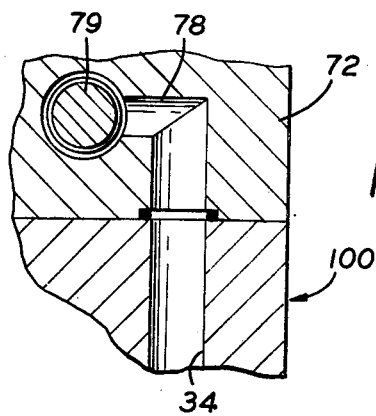
FIG. 30 is a partial sectional view on line 30—30 of FIG. 29.

Referring to FIGS. 29 and 30, a single inlet pressure, four-way valve with a dual exhaust is shown mounted on a 100 module block. This combination is exemplary, and is obviously one of a great many which are possible. The valve indicated generally at 71 is a conventional solenoid-operated valve except for ports drilled in the spool housing 72 for connection with the ports in the 100 block. Thus, a port 73 in the center portion of spool housing 72 connects the valve chamber with pressure port 28 in the block and a port 74 connects the pilot port 29 with the pilot pressure chamber. O-ring seals are provided between pilot ports 29 and 74 and between pressure ports 28 and 73. Valve 71 may be provided with indicator lights 71a to show that the solenoids in the valve housing are operating.

Similarly, ports 75 and 76 connect the valve chamber with the exhaust recess 26 in the top surface of the block 100. Ports 77 and 78 provide connection between the valve chamber and the ports 33 and 34 of the block (see FIG. 30). The electrical control wires for the solenoid are indicated generally at 80 and pass from the channel 12 in the block through a plug and socket construction partially located in recess 31 to the solenoid of the valve. This plug and socket construction will be later described in detail in connection with FIGS. 34 and 35.

In FIG. 29 the valve is shown in neutral or closed position. When the valve spool 79 is actuated to the right by the solenoid, the pressure manifold 21 will be connected through ports 28 and 73 to valve port 77 and supply port 33 in the block 100 to send pressure fluid to the device to be operated. Return fluid from port 34 will flow through valve port 78, and exhaust ports 76 and 27 to exhaust manifold 22.

The pilot section of the valve is directly connected to the pressure manifold 21 of the block 100 so that the maximum line pressure carried in the manifold is transmitted to the pilot section at all times regardless of the pressure in other parts of the valve. Also, the ball check 29′ maintains the manifold pressure in the pilot section if the manifold pressure should momentarily drop below the minimum operating pressure of the valve.

Figure 31:
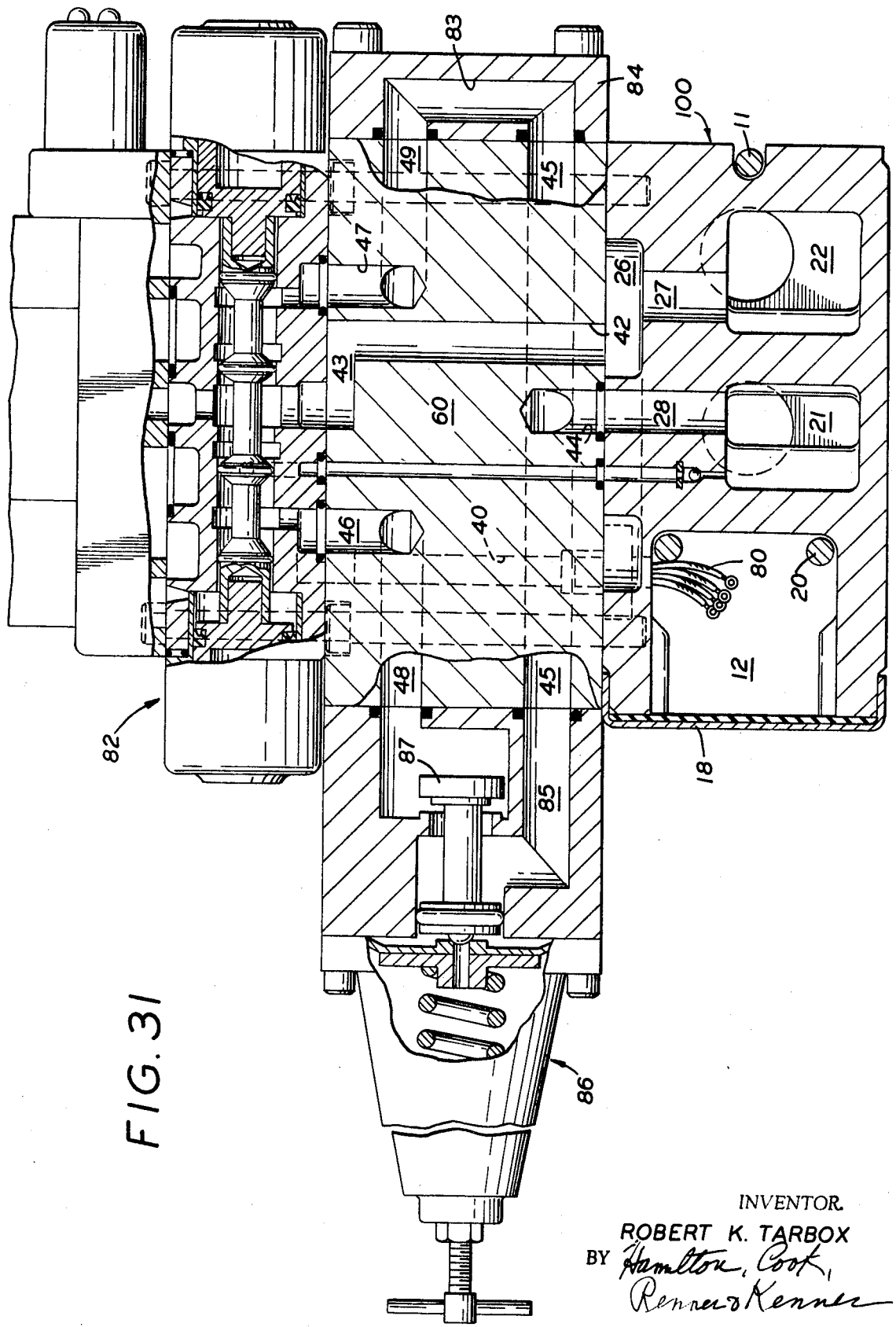
FIG. 31 is a vertical sectional view, partly in elevation, of the adaptor block of FIG. 23 and a dual pressure spool valve superposed upon the module block of FIG. 7, with a regulator abutting one end of the adaptor block and a recirculating end cap abutting the other end.

The exemplary combination in FIG. 31 shows a conventional solenoid-operated four-way valve 82 having a dual inlet pressure with a single exhaust mounted on a dual pressure adaptor block 60 which is superposed upon a 100 module block. In this case the pressure fluid from manifold 21 is divided and flows through ports 44 and 45 to opposite ends of block 60. At one end the fluid passes through a U-shaped passage 83 in a recirculating plate 84 abutting the end of block 60, and thence through ports 49 and 47 to one end of the valve chamber.

At the other end, the flow is through port 85 of a conventional pressure regulator 86, and thence past its piston 87 and through ports 48 and 46 to the other end of the valve chamber. The return flow is from the center of the valve chamber through offset 43 and port 42 in block 60 to exhaust manifold 22. Thus a regulated pressure is supplied to one end of the valve.

Figure 32:
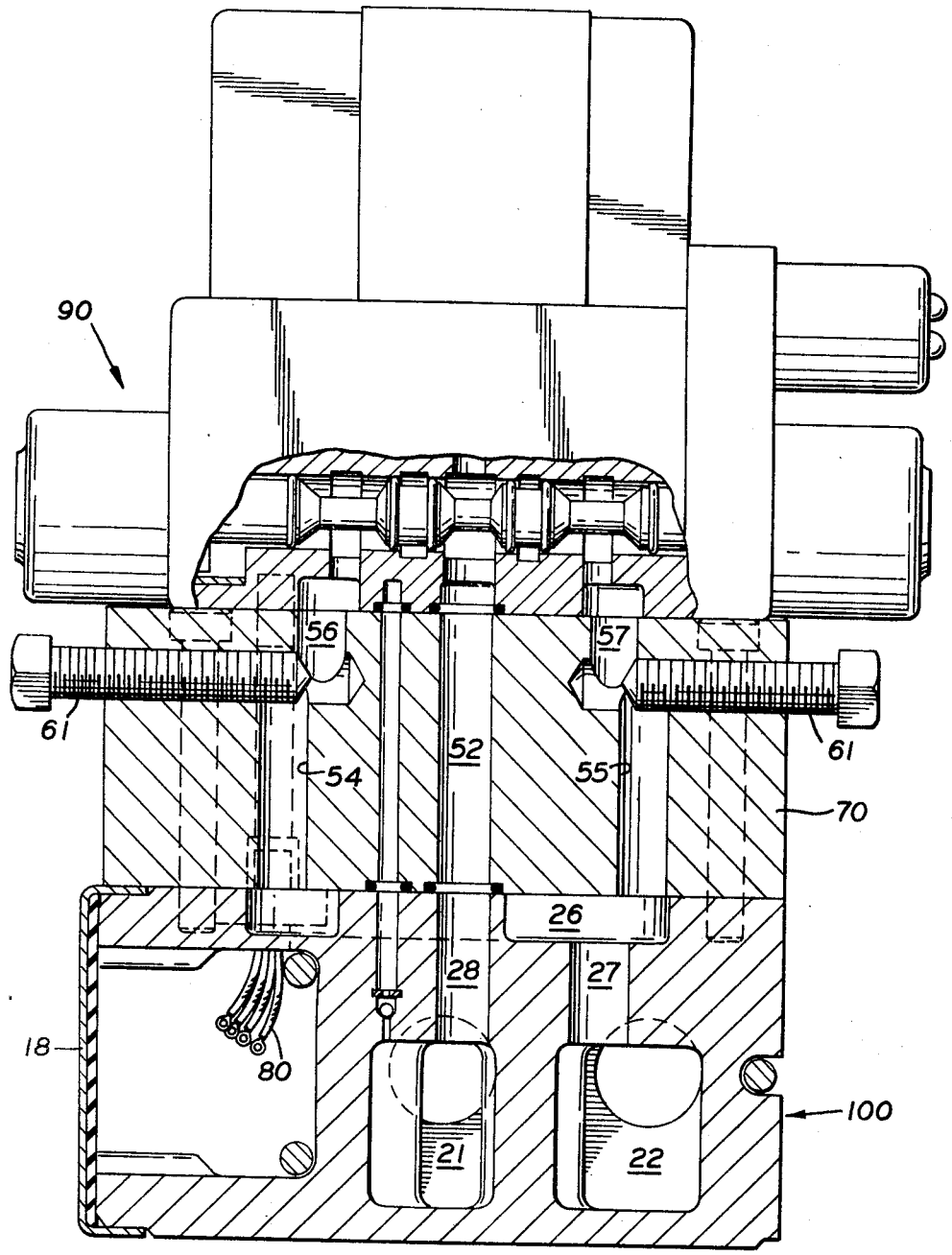
FIG. 32 is a vertical sectional view, partly in elevation, of the adaptor block of FIG. 26 and a single pressure spool valve superposed upon the module block of FIG. 7.

In FIG. 32, the exemplary combination includes a conventional solenoid-operated valve 90 having a single inlet pressure with dual exhaust mounted on a dual exhaust adaptor block 70 superposed upon a 100 module block. In this case, the single pressure is supplied to the valve through ports 28 and 52, and the dual exhaust from the valve is metered from ports 56 and 57 into ports 54 and 55 and thence flows through recess 26 and port 27 to the exhaust manifold 22.

In FIG. 33, a conventional valve 90 is superposed directly on a 200 module block with a conventional pressure regulator 86 abutting the front end of the block. In this example, the inlet pressure from pressure manifold 21 passes through port 38 into port 85 of the regulator, and past the piston 87 through ports 37 and 28 of block 200 into the center of the valve chamber. The return flow from the valve exhaust ports passes through recess 26 and port 27 to the exhaust manifold 22.

FIGS. 34 and 35 show the plug and socket connection between the electrical wires 80 in any of the channels 12 of the blocks 100, 200 and 300 and the solenoids of the valves mounted on the blocks or on adaptor blocks 60 or 70 superposed thereon. The recess 31 in the top surface of each of the module blocks has a plug 91 fitting therein with the wires 80 extending through the slot 32 into the electrical channel 12 for connection with the electrical current supply lines therein. The upper projecting part 92 of plug 91 is also a socket for receiving the conductor studs 93 in a plug 94 connected by wires 95 to the solenoids of the valve. If the valve is mounted directly on the module block, the plug 94 is carried in the valve housing, and if an adaptor block is mounted between the module block and the valve, as shown in FIG. 37, the wires 95′ extend down through the vertical slot 40 or 50 in the blocks 60 or 70, respectively, to another plug 94 lodged in the bottom of the slot and connected to a plug and socket member 91 located in the recess 31 in the module block. In this case the wires 95′ may be embedded in an insulation material 96 filling the slot 40 or 50 in the adaptor block.

In the exemplary combination shown in FIG. 36, a single inlet pressure dual exhaust valve 90 is mounted on a 70 adaptor block as in FIG. 32, but the block 70 is superposed on a 200 module block, and a pressure regulator 86 is connected in abutment with the front end of the 200 block. Thus, the pressure fluid from manifold 21 is conducted through ports 38 and 85 through the regulator and thence through ports 37 and 52 to the center of the valve chamber so as to control the inlet pressure at a reduced value as desired.

FIG. 38 shows a valve 90 mounted directly upon a 300 module block which has no connection between the pressure manifold 21 and the inlet 28 to the valve. In this case the front end of port 37 is tapped at 37′ so that a desired auxiliary pressure line may be connected thereto for supplying inlet pressure to the valve. In this case the return flow from the valve is into exhaust recess 26 and thence into exhaust manifold 22.

FIG. 39 shows an external feed cover plate 105 which may be attached to the front end of a 60 adaptor block to block off the manifold pressure at one end of the dual pressure port 45. A tapped port 98 in the plate 105 registers the upper pressure port 49 in the block so that an external source of controlled pressure can be connected thereto.

FIG. 40 shows a plate 106 attached to the end of a 60 adaptor block with two tapped ports 107 and 108 for connection with a pressure regulator or the like at a remote location.

Figure 41:
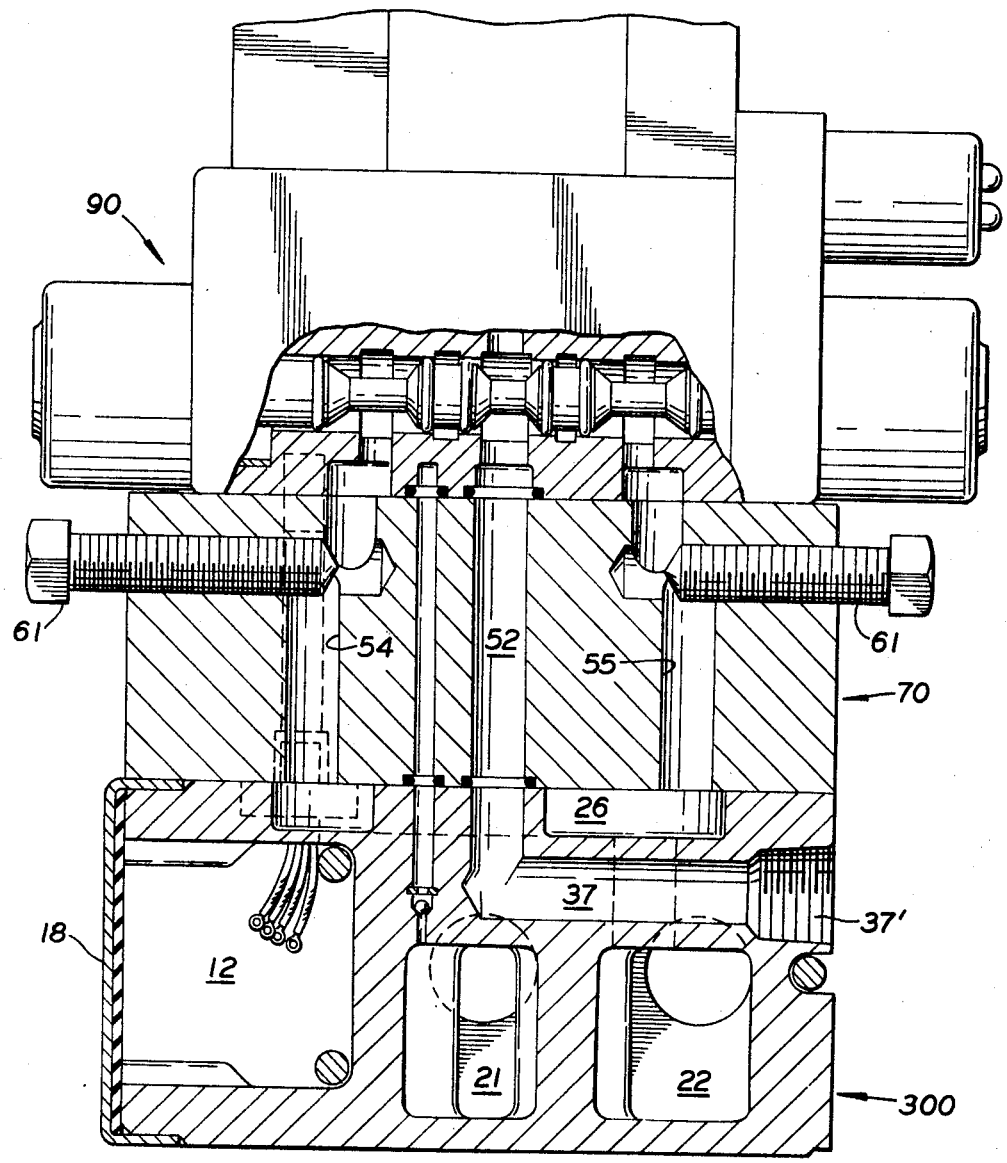
FIG. 41 is a vertical sectional view, partly in elevation, of the adaptor block of FIG. 26 and a single pressure spool valve superposed upon the module block of FIG. 16.

FIG. 41 is a view similar to FIG. 6 in showing a single inlet pressure valve 90 with a dual exhaust mounted on a 70 block for metering the exhaust, but the 70 block is superposed on a 300 module block. In this case the manifold pressure is not connected to the valve but a controlled pressure from an external source is connected to the pressure port 37 to flow through port 52 to the central portion of the valve. The dual metered exhausts from ports 54 and 55 connect with the exhaust recess 26 and thence with the exhaust manifold 22.

FIG. 42 shows a dual inlet valve 82 with a single exhaust mounted on a 60 adaptor block which is superposed upon a 300 module block, the 60 block having a regulator 86 mounted on one end and a recirculating plane 102 on the other end. The inlet pressure supply to port 37 is adapted to be from an external source with the pressure flow through port 45 to one end of the valve passing through the pressure regulator 86. The flow through passageway 45 to the other end of the valve passes through the port 99 of the recirculating plate 102 to the inlet ports 49 and 47. The purpose of the plate is to provide for future connection with another regulator 86 or the like when desired.

The schematic view of FIG. 43 shows the three module blocks 100, 200 and 300 in juxtaposition, the adaptor blocks 60 and 70, the pressure regulator 86, the end plates 105 and 106, and the recirculating cover plate 102. Also shown are a regulator 108 for regulating the inlet pressure to the valve, and a blank cover plate 109 for blocking off the top of any of the module blocks 100, 200 or 300 in case the block is presently inoperative in the system but is available for future use at any time.

The arrows in FIG. 43 indicate the several locations which may be selected for any and all of the various adaptor blocks and accessories depending upon the requirements of the system as it may be changed or added to from time to time. Thus, either of the blocks 60 or 70 or the blank cover plate 109 may be selectively mounted on the top surface of any of the module blocks 100, 200 or 300. The regulators 86 or 108 may be selectively mounted on either end of block 60 and on the front end of module block 200. The plates 105, 106 and 102 also may be selectively mounted on either end of block 60 and on the front end of module block 200.

It will be observed that for convenience in making changes in an installed system, a 200 module block can be converted into a 100 block by mounting the recirculating plate 102 on the front end of the 200 block. Similarly, a 200 module block can be converted to a 300 block by mounting the plate 105 on the front end of the 200 block. However, the converted block would not permit further modifications, such as attaching a pressure regulator.

It will be obvious that a large selection of solenoid-operated valves as well as pressure regulator valves may be used in the present system by drilling inlet and exhaust ports in the valve housing to register with connecting ports in the module and adaptor blocks. For example, single or double solenoid valves, two position and three position, with or without locking or non-locking manual override, and having single or dual inlet pressure and single or dual exhaust, are all interchangeable. The number and arrangement of the module blocks may be varied at will since they all have registering transverse manifold and electrical passageways, vertical supply and return ports, and pressure ports and exhaust recesses at the same location for alignment with the ports in the adaptor blocks or valves which may be superposed thereon.

The multiplicity of arrangements and combinations in the novel system, as well as future changes and additions to suit changing requirements, can all be quickly and easily made without changing external piping or wiring because all conduit and wiring connections are made internally between the blocks and accessories.

I claim:

1. A module block for a fluid pressure valve manifold system having a rectangular configuration with top, bottom, side and end surfaces, said side surfaces adapted for abutting the side surfaces of like blocks, said block having pressure and exhaust manifold passageways extending therethrough from side to side, an electrical conductor channel extending transversely through one end, an exhaust recess formed in the top surface, a pressure port in the top of said block adjacent to said exhaust recess and an exhaust port within said recess and connected to said exhaust manifold, and fluid device supply and return ports connecting said top and bottom surfaces, said top surface adapted to abut a surface of a fluid pressure valve with the valve and block pressure ports and supply and return ports in registry, and with the valve exhaust ports in registry with said exhaust recess, the pressure port in the top of the block being connected to a pressure port in the end surface opposite to the electrical channel.

2. The module block defined in claim 1, in which the pressure port in the top of the block and the pressure manifold are connected to pressure ports in the end surface opposite the electrical channel.

3. The module block defined in claim 2, in which there is a pilot port in the top of the block connected to the pressure manifold and adapted to register with a pilot pressure port in the valve surface.

4. The module block defined in claim 1, in which there is a pilot port in the top of the block connected to the pressure manifold and adapted to register with a pilot pressure port in the valve surface.

5. A valve manifold module system comprising a fluid pressure valve having fluid device supply and return ports and pressure and exhaust ports on one surface, a rectangular module block having side surfaces constructed for abutting the side surfaces of like blocks and having top, bottom and end surfaces, said block having pressure and exhaust manifold passageways extending transversely therethrough, an electrical conductor channel extending transversely through one end, an exhaust recess formed in the top surface, a pressure port in the top of the block, an exhaust port within said recess and connected to said exhaust manifold, fluid device supply and return ports extending through the block from top to bottom, said block top surface abutting the valve surface with the valve and block pressure ports and supply and return ports in registry and with the valve exhaust ports in registry with said exhaust recess, the pressure port in the top of the block being connected to a pressure port in the end surface opposite to the electrical channel.

6. The valve manifold module system of claim 5 having an adaptor block superposed upon the module block and in abutment with the valve surface, said adaptor block having fluid device supply and return ports extending from top to bottom and registering with the supply and return ports in the module block and valve, said adaptor block having a bottom pressure port registering with the module pressure port and dual top pressure ports registering with dual valve pressure ports, said top and bottom pressure ports being connected to opposite ends of said adaptor block, and an exhaust port extending from top to bottom of the adaptor block and registering with the valve exhaust port and with the module block exhaust recess.

7. The valve manifold module system of claim 6 having at least a second module block laterally abutting the first module block and a second valve, and a second adaptor block selectively superposable upon the second module block and in abutment with the second valve surface, second adaptor block having fluid device supply and return ports extending from top to bottom registering with the supply and return ports in the second module block and second valve, said adaptor block having a pressure port extending therethrough from top to bottom registering with the second module pressure port and a single pressure port of the second valve, dual exhaust ports extending from top to bottom of said second adaptor block registering with dual second valve exhaust ports and with the second module block exhaust recess.

8. The valve manifold module system of claim 5 having an adaptor block superposed upon the module block and in abutment with the valve surface, said adaptor block having fluid device supply and return ports extending from top to bottom registering with the supply and return ports in the module block and valve, said adaptor block having a pressure port extending therethrough from top to bottom registering with the module pressure port and a single valve pressure port, dual exhaust ports extending from top to bottom of said adaptor block registering with dual valve exhaust ports and with the module block exhaust recess.

9. The valve manifold module system of claim 5 in which the pressure port in the top of the module block is connected to the pressure manifold.

10. The valve manifold module system of claim 9 having an adaptor block superposed upon the module block and in abutment with the valve surface, said adaptor block having fluid device supply and return ports extending from top to bottom registering with the supply and return ports in the module block and valve, said adaptor block having a bottom pressure port registering with the module pressure port and dual top pressure ports registering with dual valve pressure ports, said top and bottom pressure ports being connected to opposite ends of said adaptor block, and an exhaust port extending from top to bottom of the adaptor block registering with the valve exhaust port and with the module block exhaust recess.

11. The valve manifold module system of claim 9 having an adaptor block superposed upon the module block and in abutment with the valve surface, said adaptor block having fluid device supply and return ports extending from top to bottom registering with the supply and return ports in the module block and valve, said adaptor block having a pressure port extending therethrough from top to bottom registering with the module pressure port and a single valve pressure port, dual exhaust ports extending from top to bottom of said adaptor block registering with dual valve exhaust ports and with the module block exhaust recess.

12. The valve manifold module system of claim 5, in which the pressure port in the top of the block and the pressure manifold are connected to pressure ports in the end surface opposite to the electrical channel.

13. The valve manifold module system of claim 12 having an adaptor block superposed upon the module block and in abutment with the valve surface, said adaptor block having fluid device supply and return ports extending from top to bottom registering with the supply and return ports in the module block and valve, said adaptor block having a bottom pressure port registering with the module pressure port and dual top pressure ports registering with valve pressure ports, said top and bottom pressure ports being connected to opposite ends of said adaptor block, and an exhaust port extending from top to bottom of the adaptor block registering with the valve exhaust port and with the module block exhaust recess.

14. The valve manifold module system of claim 12 having an adaptor block superposed upon the module block and in abutment with the valve surface, said adaptor block having fluid device supply and return ports extending from top to bottom registering with the supply and return ports in the module block and valve, said adaptor block having a pressure port extending therethrough from top to bottom registering with the module pressure port and a single valve pressure port, dual exhaust ports extending from top to bottom of said adaptor block registering with dual valve exhaust ports and with the module block exhaust recess.

15. The valve manifold system of claim 5 having an adaptor block superposed upon the module block and in abutment with the valve surface, said adaptor block having fluid device supply and return ports extending from top to bottom registering with the supply and return ports in the module block and valve, said adaptor block having a bottom pressure port registering with the module pressure port and dual top pressure ports registering with dual valve pressure ports, said top and bottom pressure ports being connected to opposite ends of said adaptor block, and an exhaust port extending from top to bottom of adaptor block registering with the valve exhaust port and with the module block exhaust recess.

16. The valve manifold module system of claim 5 having an adaptor block superposed upon the module block and in abutment with the valve surface, said adaptor block having fluid device supply and return ports extending from top to bottom registering with the supply and return ports in the module block and valve, said adaptor block having a pressure port extending therethrough from top to bottom registering with the module pressure port and a single valve pressure port, dual exhaust ports extending from top to bottom of said adaptor block registering with dual valve exhaust ports and with the module block exhaust recess.

References Cited

UNITED STATES PATENTS

| | | | |
|---|---|---|---|
| 3,111,139 | 11/1963 | Beckett et al. | 251—367 XR |
| 3,202,170 | 8/1965 | Holbrook | 251—367 XR |
| 3,265,352 | 8/1966 | Allen | 251—367 XR |
| 3,323,547 | 6/1967 | Van Husen et al. | 137—625.64 |

HENRY T. KLINKSIEK, Primary Examiner

U.S. Cl. X.R.

137—269, 608